(12) United States Patent
Stiekes et al.

(10) Patent No.: US 8,528,070 B2
(45) Date of Patent: Sep. 3, 2013

(54) SYSTEM AND METHOD FOR SECURE SERVICE DELIVERY

(75) Inventors: Bryan E. Stiekes, Warren, MI (US); Shawn A. Williams, Frisco, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1286 days.

(21) Appl. No.: 11/899,288

(22) Filed: Sep. 5, 2007

(65) Prior Publication Data
US 2009/0064305 A1 Mar. 5, 2009

(51) Int. Cl.
*H04L 29/06* (2006.01)

(52) U.S. Cl.
USPC ............ 726/11; 726/2; 726/3; 726/14; 726/15

(58) Field of Classification Search
USPC .......................................... 726/2, 3, 11, 14, 15
See application file for complete search history.

(56) References Cited

U.S. PATENT DOCUMENTS

| | | | |
|---|---|---|---|
| 7,616,643 B2* | 11/2009 | Delaney et al. | 370/395.5 |
| 7,694,343 B2* | 4/2010 | Sobel et al. | 726/27 |
| 2002/0032766 A1* | 3/2002 | Xu | 709/223 |
| 2002/0032797 A1* | 3/2002 | Xu | 709/238 |
| 2002/0038339 A1* | 3/2002 | Xu | 709/203 |
| 2002/0040434 A1* | 4/2002 | Elliston et al. | 713/186 |
| 2004/0098624 A1* | 5/2004 | Wesinger et al. | 713/201 |
| 2004/0103321 A1* | 5/2004 | Wesinger et al. | 713/201 |
| 2006/0041937 A1* | 2/2006 | Chandley et al. | 726/12 |
| 2006/0075140 A1* | 4/2006 | Sobel et al. | 709/245 |
| 2006/0092950 A1* | 5/2006 | Arregoces et al. | 370/396 |
| 2006/0095960 A1* | 5/2006 | Arregoces et al. | 726/11 |
| 2007/0248103 A1* | 10/2007 | Delaney et al. | 370/395.52 |
| 2008/0225875 A1* | 9/2008 | Wray et al. | 370/419 |
| 2009/0129385 A1* | 5/2009 | Wray et al. | 370/392 |
| 2009/0199177 A1* | 8/2009 | Edwards et al. | 718/1 |
| 2009/0241108 A1* | 9/2009 | Edwards et al. | 718/1 |
| 2009/0300605 A1* | 12/2009 | Edwards et al. | 718/1 |

FOREIGN PATENT DOCUMENTS

WO WO 02/03220 * 1/2002

* cited by examiner

*Primary Examiner* — Bradley Holder

(57) ABSTRACT

A secure service delivery network, including a service delivery compartment connected to deliver services to a plurality of client networks. The secure service delivery network includes a first firewall connecting the service delivery compartment to a first virtual local area network. The secure service delivery network includes a plurality of firewalls each connecting one of the plurality of client networks to the first virtual local area network, whereby no communications between the plurality of client networks can be made over the first virtual local area network. A related method is also described.

12 Claims, 6 Drawing Sheets

SYSTEM AND METHOD FOR SECURE SERVICE DELIVERY

TECHNICAL FIELD

The present disclosure is directed, in general, to service delivery in data processing system networks.

BACKGROUND OF THE DISCLOSURE

Delivery of services over data processing system networks is a growing industry. If a service provider provides services to multiple clients, typical solutions can expose one client's networks and data to other clients. There is, therefore, a need in the art for a systems and methods for secure service delivery.

SUMMARY OF THE DISCLOSURE

Various disclosed embodiments include a secure service delivery network, including a service delivery compartment connected to deliver services to a plurality of client networks. The secure service delivery network includes a first firewall connecting the service delivery compartment to a first virtual local area network. The secure service delivery network includes a plurality of firewalls each connecting one of the plurality of client networks to the first virtual local area network, whereby no communications between the plurality of client networks can be made over the first virtual local area network.

Other embodiments include a method of delivering services to a plurality of client networks. The method includes receiving requests for services from a plurality of client networks, and delivering services to the plurality of client networks using a secure service delivery network. In various embodiments of the disclosed methods, the secure service delivery network includes a service delivery compartment connected to deliver the services to the plurality of client networks, a first firewall connecting the service delivery compartment to a first virtual local area network, and a plurality of firewalls each connecting one of the plurality of client networks to the first virtual local area network. In various embodiments, no communications between the plurality of client networks can be made over the first virtual local area network.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
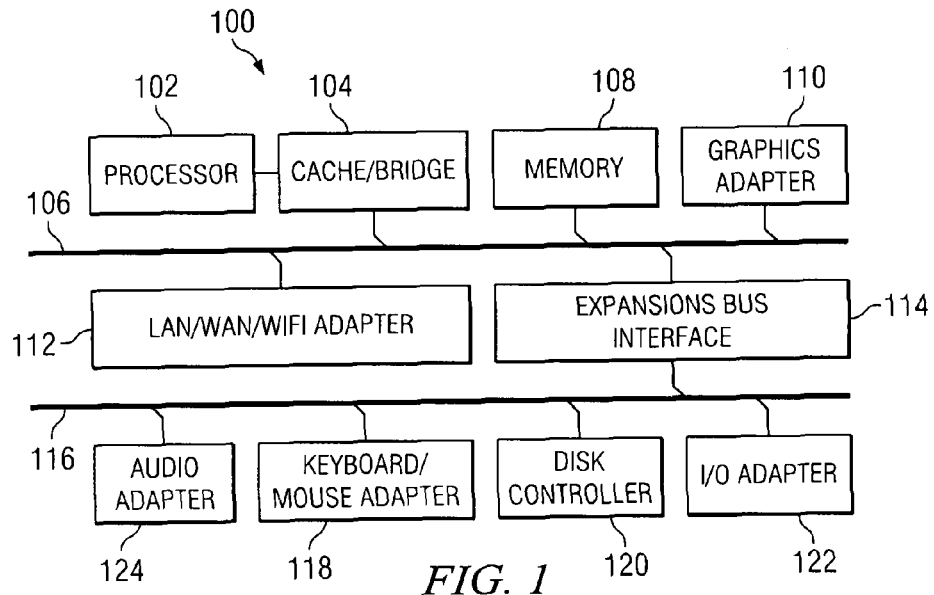
FIG. 1 depicts a block diagram of a data processing system in which an embodiment can be implemented.

FIG. 1 depicts a block diagram of a data processing system in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are an accessible main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The data processing system described above can be used to implement one or more of the systems described herein. Other hardware described herein is known to those of skill in the art, and the particulars of the structure and operation of the individual components is not necessary for an understanding of the claimed embodiments.

In the following description, reference is made to one or more of FIGS. 2-7. In these figures, where like reference numbers appear, the depicted element is a similarly configured system element, subject to minor implementation or configuration changes as are understood by those of skill in the art. For example, where element FW01 231 appears, as described below, in each of FIGS. 2-7, it generally represents the same functional element in each case, and multiple ones of the elements with like reference numbers may appear in a single figure. Further, a single reference numeral may be used to specify multiple elements, such as client wide-area-networks (WANs) 206, where the structure of each WAN is unimportant to the presently disclosed embodiments.

Various disclosed embodiments include mechanisms by which internal and external clients systems and networks can be connected to a Service Delivery Network (SDN) to facilitate service delivery and client access to leveraged applications.

Various disclosed embodiments use Virtual Routing and Forwarding (VRF) functions. Virtual Routing and Forwarding is a technology included in IP (Internet Protocol) network routers that allows multiple instances of a routing table to exist in a router and work simultaneously. This increases functionality by allowing network paths to be segmented without using multiple devices. Because traffic is automatically segregated, VRF also increases network security and can eliminate the need for encryption and authentication. Internet service providers (ISPs) often take advantage of VRF to create separate virtual private networks (VPNs) for customers; thus the technology is also referred to as VPN routing and forwarding.

VRF acts like a logical router, but while a logical router may include many routing tables, a VRF instance generally uses only a single routing table. In addition, VRF requires a forwarding table that designates the next hop for each data packet, a list of devices that may be called upon to forward the packet, and a set of rules and routing protocols that govern how the packet is forwarded. These tables prevent traffic from being forwarded outside a specific VRF path and also keep out traffic that should remain outside the VRF path.

A Service Delivery Framework 200 is used for logical organization and placement of Service Delivery, client, and development environments. The interconnection of these environments is accomplished via security layers. The security layers prohibit unauthorized communication between environments. Service Delivery Networks hosted within the delivery centers are connected to a Global Services Network (GSN) SDN virtual private network (VPN). This establishes global connectivity that enables "any-to-any" communication between delivery locations. Creating a global network permits virtual support, meaning any client in any region can be transparently supported by any Service Delivery resource. This architecture enables services to be securely delivered both internal and external clients from a single environment.

Service Delivery Compartment (SDC): The SDC 214 hosts those resources responsible for the delivery of leveraged services to the service provider's internal and external clients. Leveraged enterprise information technology management (EITM) services are the management, monitoring, and support services which are provided by a service provider to its clients. The leveraged EITM devices may communicate through the security layer to deliver services to internal and external systems, and to access corporate application resources in order to facilitate service delivery. These devices can also communicate through the security layer to deliver services to external customers.

Leveraged Services Compartment (LSC): LSC 216 is dedicated to providing the service provider and its clients secure access to leveraged compute resources, whereas the SDC's primary role is providing EITM services into client environments. Leveraged midrange and mainframe services can be provided from within the LSC. The LSC can provide secure access for both internal and external clients and systems to leveraged resources. One differentiator with this compartment is the dedicated environment providing clients with secure access to compute resources while permitting security policies geared towards hosted resources.

The delivery zones provide the basis for a standardized service delivery resource composition. These zones are a logical representation and are not physically restricted to a single geography.

Figure 2:
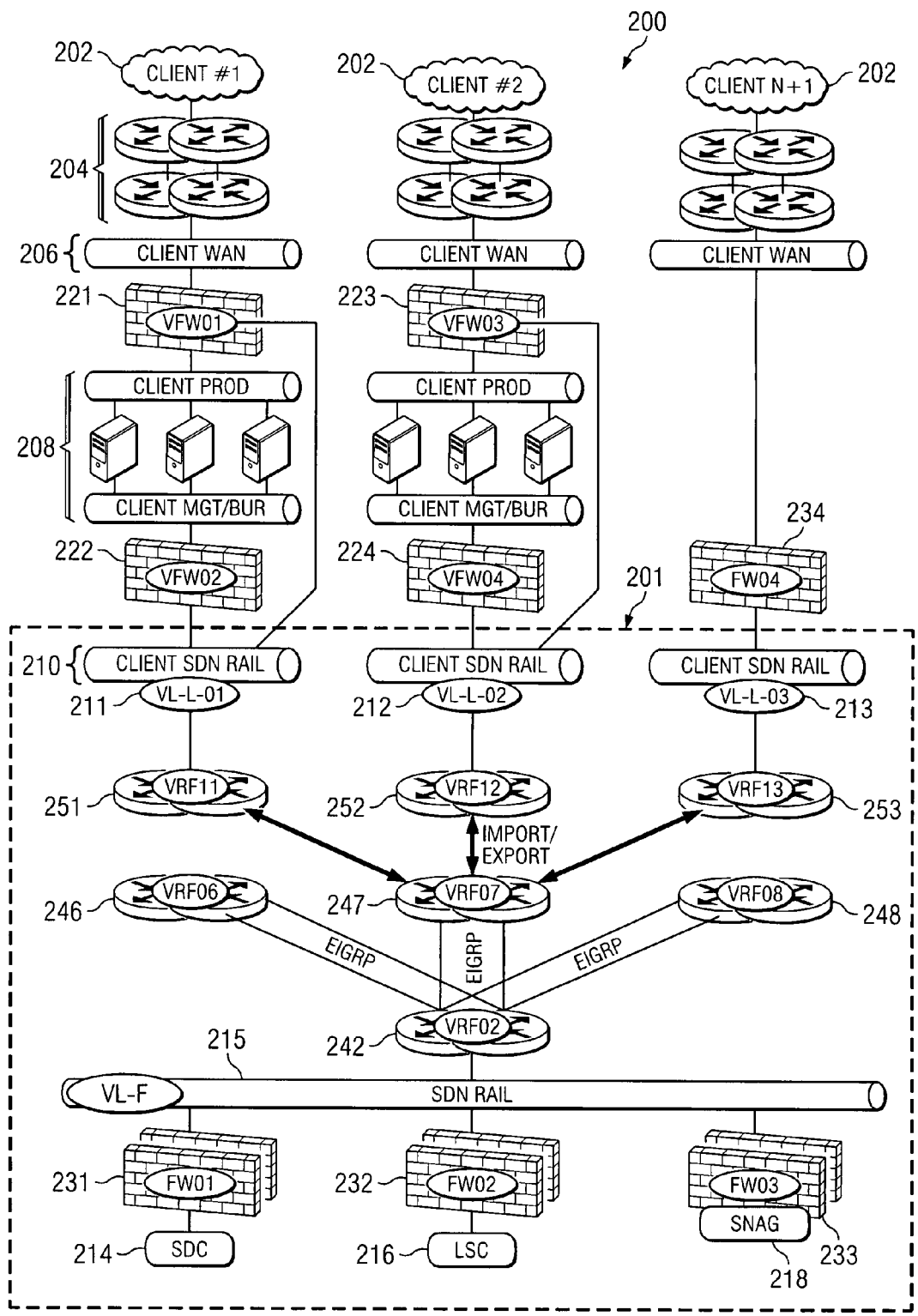
FIG. 2 shows a block-diagram of non-SNMP local client integration in accordance with a disclosed embodiment.

FIG. 2 shows a block-diagram of non-SNMP local client integration in accordance with a disclosed embodiment. FIG. 2 illustrates the client-side network, including clients 202 and their respective associated distribution networks 204, which can be implemented in any known networking system, and are each connected to a client wide area network (WAN) gateway 206. The client-side network 202/204/206 for each client may vary in particular according to the client's configuration. The client WAN gateway 206 is connected to the SDN 201 via a standard firewall such as firewall FW04 234, or via a virtual firewall such as VFW01 221 and VFW03 223. As depicted in FIG. 2, each of these connects the client WAN gateway 206 to the client SDN rail 210, and prevents any client 202 from being accessed from any other client.

A virtual firewall (VFW) is a logical firewall, and multiple logical firewall instances can be installed on a single physical appliance. This allows a configuration, memory, bandwidth, and processing capacity to be dedicated on a per-client basis, while leveraging the underlying physical hardware saving on space, power, etc. The VFW therefore has advantages over a standard firewall (FW), but those of skill in the art will recognize that where a VFW or FW is described herein, the VFW or FW could be implemented using either technology, with proper configuration.

Some embodiments also include a consolidated Management and Back-Up & Restore (Client Mgt/BUR) Rail (VLAN), client production rail (Client Prod), and supporting servers, shown collectively in FIG. 2 as systems 208. These systems 208 hosted within the unprotected "demilitarized zone" (DMZ), outside SDN 201, can be monitored for server resource application utilization and application availability. Devices 208 within the DMZ which require data back-up services from the SDN 201 can leverage their connection to client SDN rail 210 for data back-up services. Where this is used, paired VFWs, such as VFW01 221 and VFW02 222, can be used to isolate each client 202 and system 208 from other clients or systems.

Client Integration: The principle integration point of a client 202 (and client-side network 202/204/206) into the SDN 201 is the client's perimeter firewall and its connection to client SDN rail 210. In various disclosed embodiments, all clients deploy a perimeter firewall securing the client's connection point(s) with the SDN networks. The SDN 201 acts as a secure mechanism for the integration of clients with the service delivery tools and applications, precluding the need for the direct interconnection of the service provider's and its clients' corporate networks.

One advantage of the disclosed SDN 201 is its definition of a standard, secure, flexible, and highly repeatable method for the integration of internal and external clients into the service delivery environments.

In various embodiments, each client SDN rail 210 is connected to a virtual local area network (VLAN) such as VL-L-01 211, VL-L-02 212, and VL-L-03 213. A VLAN is a method of creating independent logical networks within a physical network. Several VLANs can co-exist within such a network. This helps in reducing the broadcast domain and aids in network administration by separating logical segments of a LAN that should not exchange data using a LAN. A conventional VLAN consists of a network of computers that behave as if connected to the same link layer network—even though they may actually be physically connected to different segments of a LAN. Network administrators can configure VLANs through software rather than hardware, which makes them extremely flexible.

Each of as VL-L-01 211, VL-L-02 212, and VL-L-03 213 is connected to VRF routing/distribution nodes VRF11 251, VRF12 252, VRF13 253, VRF06 246, VRF07 247, VRF08 248, VRF02 242. Of course, more or less VRF nodes and functions could be used according to the particular implementation, as will be understood by those of skill in the art.

The VFR routing distribution nodes are connected to communicate with VLAN SDN rail VL-F 215. Also connected to VLAN SDN rail VL-F 215 are firewalls FW01 231, FW02 232, and FW03 233. These connect, respectively, with SDC 214 (described above), LSC 216 (described above), and secure network access gateway (SNAG) 218. SNAG 218 enables users to access one or more logically or physically segregated environments, such as SDC, LSC, client compartments/networks, and so on, securely through the use of encryption and user authentication. SNAG 218 preferably includes SSL VPN technology.

Various embodiments of the SDN currently include the following client integration methods:

Local Client Integration—Non-SNMP: Defines the method for integrating a client into an SDN which has not deployed Simple Network Management Protocol (SNMP) remediation.

Local Client Integration—SNMP: Defines the method for integrating a client into an SDN which has deployed SNMP remediation.

Local Client Integration—Regional Delivery Center: Defines the method for integrating a client into an SDN which is not serviced by the GSN or does not have multi-VPN capabilities.

Remote Client Integration: Defines the method for extending a client's access beyond the delivery center hosting their client perimeter firewall to leveraged toolsets or applications hosted in a remote delivery centers.

Remote Multi-Homed Client Integration: Defines the method for extending a multi-homed client's access between and beyond the delivery centers hosting their client perimeter firewalls to leveraged toolsets or applications hosted in remote delivery centers.

The various client integration methods defined by the SDN allow the service provider to deliver leveraged services to any client from any delivery center using the Global Services Network.

Client Integration network address translation (NAT) Policy: In order to facilitate the communication of SDN hosted resources to managed client devices, a client's network can be discovered prior to integration with the SDN. All client network addressing can be translated to reused public addressing. This reused addressing will permit all client devices to be represented within SDN environments globally without potential overlap. Client network addressing can be translated on a 24 subnet basis. The client NAT rule can be duplicated at each perimeter with which the client interfaces the SDN. NAT of the client's enterprise network addressing can be performed on the "frontside" firewall of the client hosting compartment, for example at VFW02 222, VFW04 224, and FW04 234.

SDN NAT addressing can be allocated and managed by the service provider's standard network naming and address management. SDN NAT addressing can make use of 'reused' public addressing in order to gain access to adequate IP addressing pools. SDN NAT addressing preferably will not be propagated across the the service provider's corporate Intranet or the SDN WAN and will be limited in propagation to individual client private-SDN VPNs and local SDN environments.

Local Client Integration—Non-SNMP: The local client integration methods facilitate the connection of a client perimeter firewall deployed within the service provider's delivery center to the SDN. This integration method preserves the security integrity of the clients' compartment and/or enterprise while providing them access to the service provider's leveraged tools and applications.

FIG. 2 shows a block-diagram of non-SNMP local client integration in accordance with a disclosed embodiment. In order to gain access to the SDN each client's perimeter firewall(s) are connected to a client-dedicated client SDN Rail (VLAN VL-L 211, 212, 213). Client perimeter firewalls include the 'frontside'(VFW01 231 & VFW01 233) and 'backside'(VFW01 232 & VFW04 224) firewalls of Data Communication Network Architecture (DCNA) compliant hosting compartments as well as the client perimeter firewalls of clients who do not have DCNA-compliant hosting compartments or to whom the service provider is not providing hosting services (FW04). The client SDN Rail (VLAN VL-L 211, 212, 213) can be hosted on leveraged network infrastructure within the the service provider's delivery center.

The client perimeter firewall(s) (VFW01 231, VFW01 232, VFW01 233, VFW04 224, and FW04 234) are configured with static routes directing all traffic destined for leveraged tools or applications hosted within the SDN to a client dedicated private-SDN (PSDN) VRF (VRF11 251, VFR12, VRF13 253) configured on the ESD distribution switches. The pSDN VRF (VRF11 251, VRF12 252, VRF13 253) is associated with the client SDN Rail (VLAN VL-L 211, 212, 213) and is configured with static routes directing traffic destined for the client's hosting compartment or enterprise network to the appropriate client perimeter firewall.

A Local SDN VRF (VRF06 246, VRF07 247, VRF08 248) is configured on each ESD distribution switch as described below. Routes known within the routing table of the pSDN (VRF11 251, VFR12, VRF13 253) to which service provider delivers services are tagged with a client specific label and are exported into the Local SDN VRF (VRF06 246, VRF07 247, VRF08 248). Routes representing access to the client-facing tools and applications rails are labeled with an SDN specific label and are imported into the pSDN (VRF11 251, VRF12 252, VRF13 253).

Client and local SDN routes are advertised dynamically between the Local SDN (VRF06 246, VRF07 247, VRF08 248) and the SDN Rail (VLAN VL-F 215) VRF (VRF02 242). The SDN Rail (VLAN VL-F 215) VRF (VRF02 242) is then configured with static routes directing traffic destined for devices hosted within the SDN to the appropriate firewall for each compartment. Various VRF nodes can communicate using Enhanced Interior Gateway Routing Protocol (EIGRP).

Individual SDN compartment firewalls (FW01 231, FW01 232, FW01 233) connected to the SDN Rail (VLAN VL-F 215) are configured with static routes directing traffic destined for client compartments or enterprise networks to the SDN Rail (VLAN VL-F 215) VRF (VRF02 242).

In some cases, the heavy use of static routing can result in added management complexity of network and security devices. However, the NATing of all client addressing to highly controlled NAT pools at the clients' perimeter firewalls allows each client to be represented with a minimum of static route statements.

Local Client Integration—SNMP: One difference between local client integration with SNMP and without SNMP is an additional routed hop between the Local SDN VRF (VRF06 246, VRF07 247, VRF08 248) and the SDN Rail (VLAN VL-F 215) VRF (VRF02 242).

In its simplest form, the SDN 201 includes a service delivery compartment, SDC 215, connected to deliver services to a plurality of client networks, including clients 202 and their respective associated distribution networks 204, each connected to a client wide area network (WAN) gateway 206. A first firewall FW01 231 connects SDC 215 to a first virtual local area network VLAN SDN rail VL-F 215. A plurality of firewalls VFW01 221, VFW03 223, and FW04 245, each connect one of the plurality of client networks 202/204/206 to the first virtual local area network VLAN SDN rail VL-F 215, whereby no communications between the plurality of client networks 206 can be made over the first virtual local area network VLAN SDN rail VL-F 215. Of course, as described herein, various embodiments include other elements for routing, distribution, firewalling, and other purposes.

Figure 3:
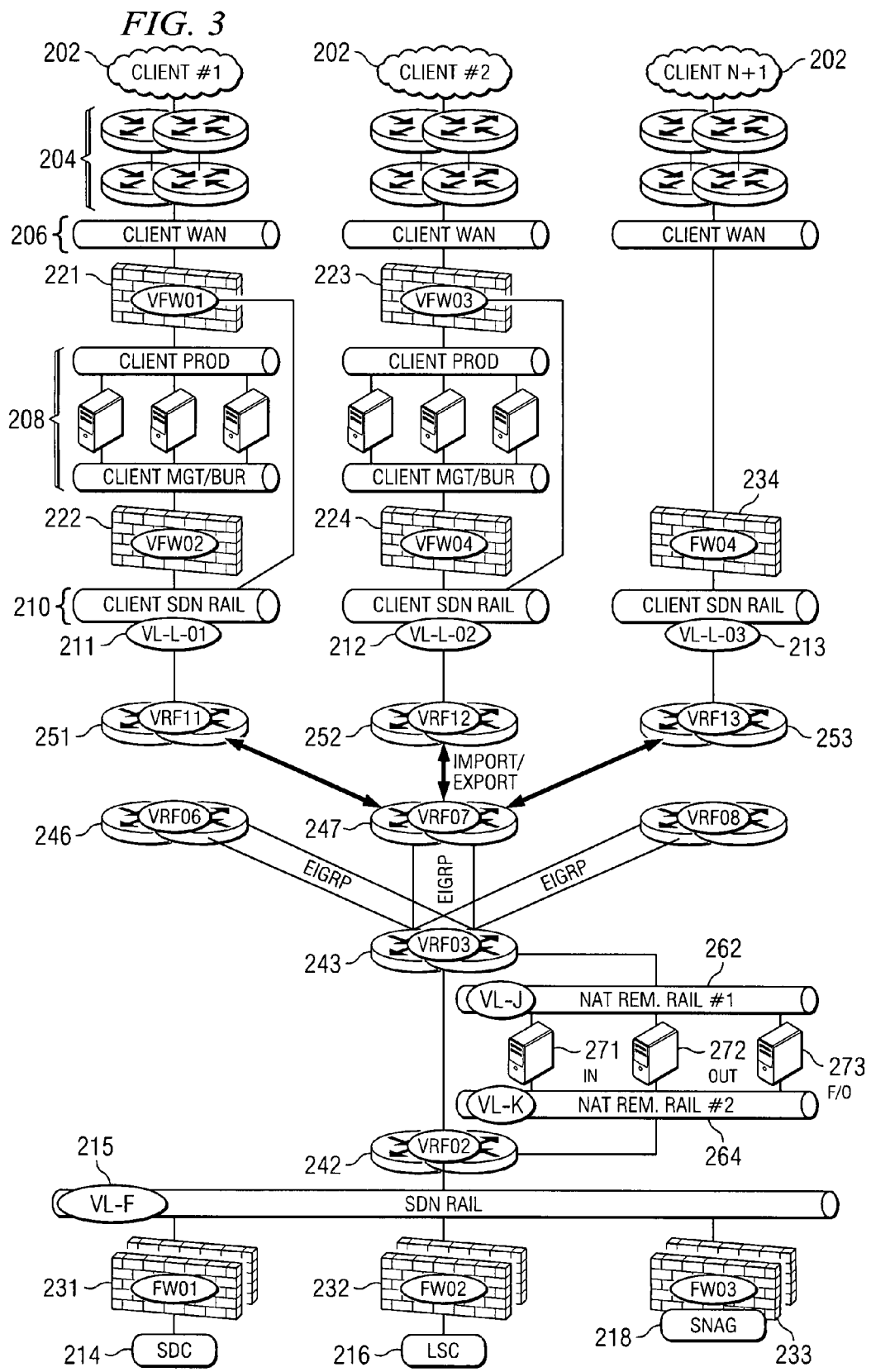
FIG. 3 shows a block-diagram of SNMP local client integration in accordance with a disclosed embodiment.

FIG. 3 shows a block-diagram of SNMP local client integration in accordance with a disclosed embodiment. In order to gain access to the SDN each client's perimeter firewall(s) are connected to a client dedicated client SDN Rail (VLAN VL-L 211, 212, 213). Client perimeter firewalls include the 'frontside'(VFW01 231, VFW01 233) and 'backside' (VFW01 232, VFW04 224) firewalls of DCNA compliant hosting compartments as well as the client perimeter firewalls of clients who do not have DCNA compliant hosting compartments or to whom the service provider is not providing hosting services (FW04).

The client SDN Rail (VLAN VL-L 211, 212, 213) can be hosted on leveraged network infrastructure within the service provider's delivery center.

The client perimeter firewall(s) (VFW01 231, VFW01 232, VFW01 233, VFW04 224, FW04 234) are configured with static routes directing all traffic destined for leveraged tools or applications hosted within the SDN to a client dedicated private-SDN (PSDN) VRF (VRF11 251, VRF12 252, VRF13 253) configured on the service provider's distribution switches. The pSDN VRF (VRF11 251, VFR12, VRF13 253) is associated with the client SDN Rail (VLAN VL-L 211, 212, 213) and is configured with static routes directing traffic destined for the client's hosting compartment or enterprise network to the appropriate client perimeter firewall.0

A Local SDN VRF (VRF06 246, VRF07 247, VRF08 248) is configured on each ESD distribution switch as described herein. Routes known within the routing table of the pSDN VRF (VRF11 251, VFR12, VRF13 253) to which the service provider delivers services can be tagged with a client specific label and can be exported into the Local SDN VRF (VRF06 246, VRF07 247, VRF08 248). Routes representing access to the client facing tools and applications rails are labeled with an SDN specific label and are imported into the pSDN pSDN VRF (VRF11 251, VFR12, VRF13 253).

Client and local SDN routes are advertised dynamically between the Local SDN VRF (VRF06 246, VRF07 247, VRF08 248) and the NAT Remediation VRF (VRF03 243) on the SDN SNMP Policy Routing switches. The NAT Remediation VRF (VRF03 243) will use policy routing to direct SNMP traffic to the NAT remediation servers while directing all other traffic to the SDN Rail (VLAN VL-F 215) VRF (VRF02 242). Client and local SDN routes are advertised dynamically between the NAT Remediation VRF (VRF03 243) and the SDN Rail (VLAN VL-F 215) VRF (VRF02 242). The SDN (VLAN VL-F 215) VRF (VRF02 242) is configured with static routes directing traffic destined for devices hosted within the SDN to the appropriate firewall for each compartment.

Network Address Translation (NAT) Remediation VRFs "remediate" or alter the payload of an SNMP packet so that the IP addresses within the payload match the 'P addresses within the header. This is done because SNMP packets are dropped as invalid if the IP addresses in the header do not match the IP addresses in the payload. NAT remediation is known to those of skill in the art, and can be implemented in hardware, software, or firmware, including the IBM® Tivoli Comprehensive Network Address Translator software product.

Individual SDN compartment firewalls (FW01 231, FW01 232, FW01 233) connected to the SDN Rail (VLAN VL-F 215) are configured with static routes directing traffic destined for client compartments or enterprise networks to the SDN (VLAN VL-F 215) VRF (VRF02 242).

SDN environments requiring SNMP remediation employ an additional pair of SDN SNMP Policy Routing switches. These switches host routed connections from each leveraged switch infrastructure within the delivery center in which the SDN is deployed.

The SDN LAN will provision an SDN Rail (VLAN VL-F 215) on the SDN distribution switches. A pair of local SDN VRFs (VRF02 242) are provisioned on the SDN distribution switches. The firewalls of each compartment (i.e. FW01 231, FW02, 232, FW03 233) within the SDN are connected to the SDN Rail (VLAN VL-F 215). The firewalls are configured with static routes directing traffic destined for the hosting compartments or enterprises of the service provider's internal or external clients to the Hot Swapable Routing Protocol (HSRP) address of the VRFs (VRF02 242) supporting the SDN Rail (VLAN VL-F 215). The SDN LAN, including F/O server 273, is provisioned NAT Remediation Rail #1 (VLAN VL-J 262) and NAT Remediation Rail #2 (VLAN VL-K 264) on the SDN distribution switches. NAT Remediation Rail #2 (VLAN VL-K 264) is associated with the SDN Rail (VLAN VL-F 215) VRFs (VRF02 242). NAT Remediation servers are dual homed to NAT Remediation Rail #1 (VLAN VL-J 262) and NAT Remediation Rail #2 (VLAN VL-K 264).

The SDN LAN provisions an inbound NAT Remediation VRF (VRF03 243) on the SDN SNMP Policy Routing switches. The SDN SNMP Policy Routing switches are connected to the SDN distribution switches with a pair of routed interfaces. One interface creates a point-to-point link with the SDN Rail VRF (VRF02 242) on the SDN distribution switches. The second SDN SNMP Policy Routing routed interface connects to a switched Layer 2 interface on the SDN Distribution switches assigned to NAT Remediation Rail #1 (VLAN VL-J 262).

The VRF (VRF02 242) supporting the SDN Rail (VLAN VL-F212) and the NAT Remediation VRF (VRF03 243) will be configured to maintain a dynamic routing relationship using Enhanced Interior Gateway Routing Protocol (EIGRP). The NAT Remediation VRF (VRF03 243) will be configured with a policy route which will inspect traffic based on protocol port. Any packet which arrives from a client network using the SNMP protocol will be directed at the NAT Remediation "IN" NAT remediation server 271 for payload remediation. After payload remediation the packets will be sent to the SDN Rail (VLAN VL-F 215) VRF (VRF02 242) for routing to the appropriate SDN compartment. All packets which are not communicating via SNMP will be dynamically routed to the SDN Rail (VLAN VL-F 215) VRF (VRF02 242) for routing to the appropriate SDN compartment.

Conversely, the SDN Rail (VLAN VL-F 215) VRF (VRF02 242) will be configured with a policy route which will inspect traffic based on protocol port. Any packet which arrived from an SDN network using SNMP will be directed at the NAT Remediation "OUT" NAT remediation server 272 for payload remediation. After payload remediation the packets will be sent to the NAT Remediation VRF (VRF03 243) for routing to the appropriate client perimeter firewall. All packets which are not communicating via SNMP will be dynamically routed to the NAT Remediation VRF (VRF03 243) for routing to the appropriate client compartment.

Each SDN SNMP Policy Routing switch will be connected to an ESD Distribution switch of each leveraged switch fabric within the service provider delivery center via an routed interface. That interface will be associated with the NAT Remediation VRF (VRF03 243) on the SDN SNMP Policy Routing switch and with the Local SDN VRF (VRF06 246, VRF07 247, VRF08 248) on each ESD distribution switch. A point-to-point link will be configured between NAT Remediation VRF (VRF03 243) and each Local SDN VRF (VRF06 246, VRF07 247, VRF08 248) and they will be configured to maintain a dynamic routing relationship using EIGRP.

Through the use of this mechanism, all SNMP traffic between the SDN and the clients accessing it can be remediated, allowing SNMP to successfully traverse the NAT boundary at the service provider's managed client perimeter firewall. This connectivity enables each SDN compartment to communicate with the compartments or enterprises or any service provider internal or external client.

Heavy use of static routing can result in added management complexity of network and security devices. However, the NATing of all client addressing to highly controlled NAT pools at the clients' perimeter firewalls will allow each client to be represented with a minimum of static route statements.

Figure 4:
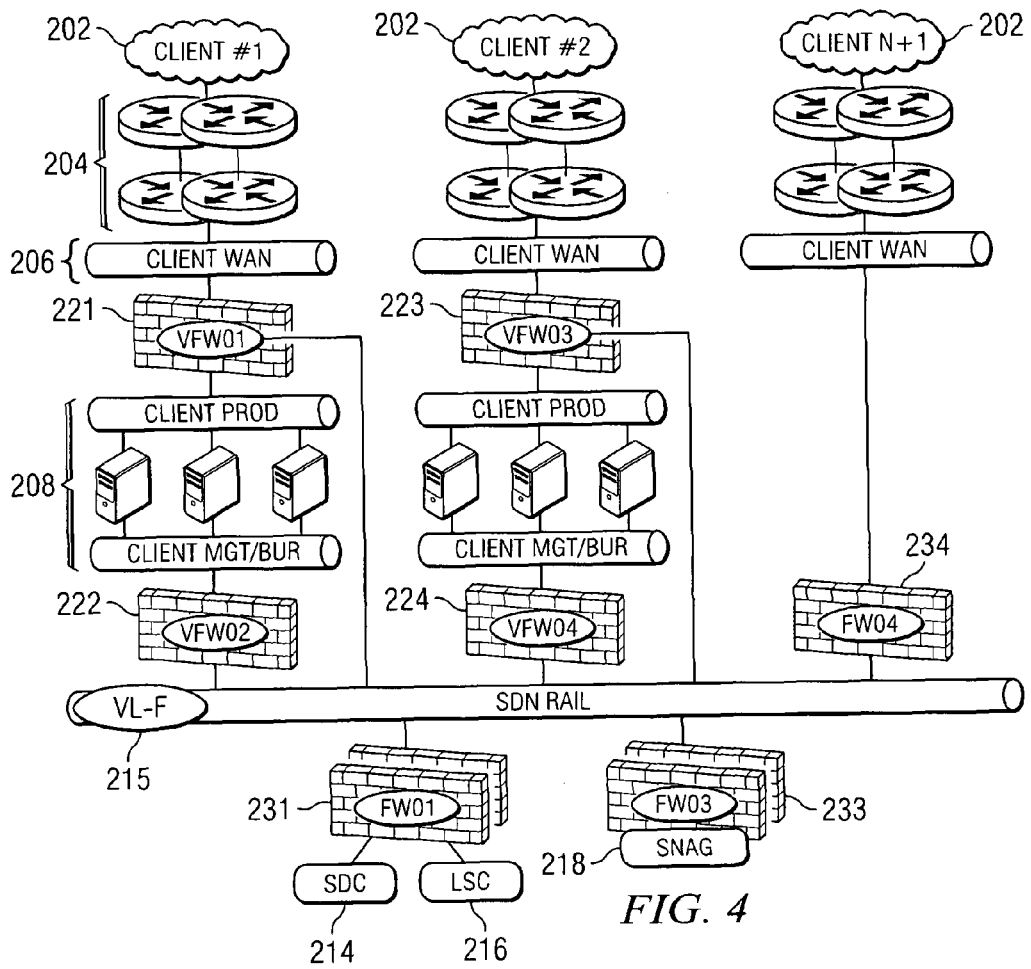
FIG. 4 depicts a block diagram of local client integration with a regional delivery center, in accordance with a disclosed embodiment.

FIG. 4 depicts a block diagram of local client integration with a regional delivery center, in accordance with a disclosed embodiment. This embodiment accommodates the deployment of small SDN environments in regional delivery centers. Within regional delivery centers it is expected that the SDN will support the perimeters of one to five clients and a small set of tools and applications leveraged to service those clients. Many regional data centers will not be provisioned with multi-VPN GSN services. However, all network infrastructures deployed as a part of the approved SDN structure are preferably consistent with the methods detailed herein. The client integration method described in this section is preferably used within regional delivery centers which are not provisioned with multi-VPN GSN services.

In order to gain access to the SDN each client's perimeter firewall(s) is connected to a SDN Rail (VLAN VL-F 215). Client perimeter firewalls include the 'frontside' (VFW01 231, VFW01 233) and 'backside' (VFW01 232, VFW04 224) firewalls of DCNA compliant hosting compartments as well as the client perimeter firewalls of clients who do not have DCNA compliant hosting compartments or to whom the service provider is not providing hosting services (FW04). The client perimeter firewall(s) (VFW01 231, VFW01 232, VFW01 233, VFW04 224, FW04 234) are configured with static routes directing traffic destined for devices hosted within the SDN to the appropriate firewall for each compartment.

Individual SDN compartment firewalls (FW01 231, FW01 233) are connected to the SDN Rail (VLAN VL-F 215) and are configured with static routes directing traffic destined for client compartments or enterprise networks to the appropriate client perimeter firewall(s) (VFW01 231, VFW01 232, VFW01 233, VFW04 224, FW04 234). In this embodiment, as opposed to the embodiment of FIG. 2, the VRF nodes are not required.

Figure 5:
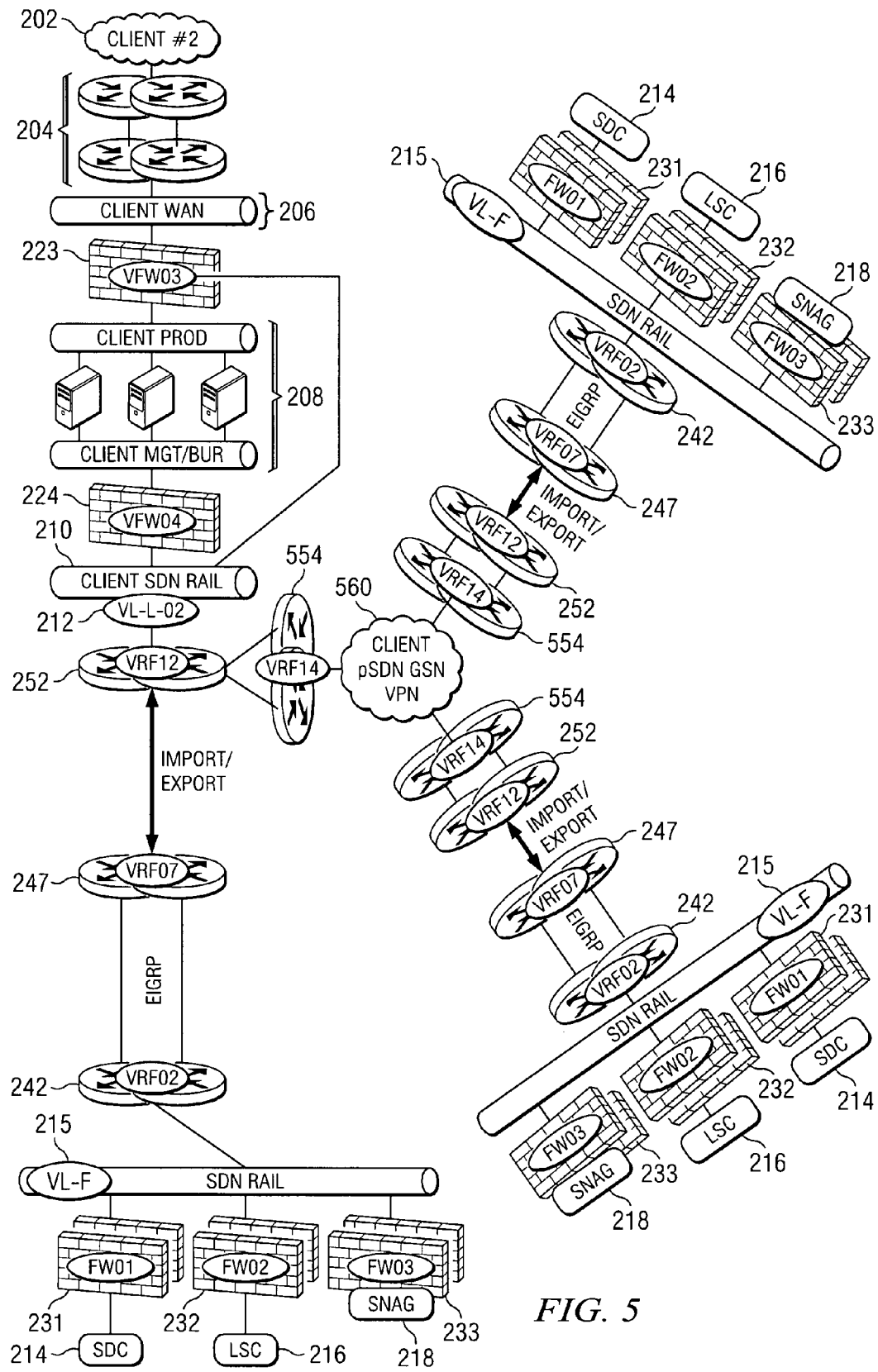
FIG. 5 depicts a block diagram of remote client integration in accordance with a disclosed embodiment.

FIG. 5 depicts a block diagram of remote client integration in accordance with a disclosed embodiment. One advantage of the global SDN architecture is the ability to deliver services into any client's hosting compartment or enterprise using a tool located at any SMC. The SDN facilitates global access to any tool for any client with a perimeter at any service provider delivery center by provisioning client dedicated private-SDN (pSDN) VPNs across the GSN. This allows a client to reach any SDN in any service provider delivery center supported by multi-VPN GSN services via a dedicated, segregated, and secure "private SDN." As described above, each client is provisioned a client-dedicated private-SDN (pSDN) VRF (VRF14 554, VRF12 252, VRF07 247) configured on the delivery center's leveraged ESD distribution switches. This VRF serves as the anchor of the client's dedicated pSDN VPN which can be extended to any delivery center globally. A client-dedicated pSDN GSN VPN 560 is provisioned to each delivery center hosting leveraged tools or applications which the client requires access too. Within each delivery center the client's pSDN VPN 560 is extended across the delivery center's leveraged multi-VRF capable network infrastructure and is terminated on the client's dedicated pSDN VRF (VRF14 554, VRF12 252, VRF07 247) configured on each delivery center's leveraged ESD distribution switches. When provisioned the client's pSDN VPN constitutes a dedicated, globally extendable, semi-trusted WAN tasked only with providing that client access to the service provider's leveraged tools and applications. Since the VPN is provisioned within the "no-man's-land" that exists between the client's perimeter firewall and the SDN compartment firewalls, it is considered semi-trusted and the client is not required to provision additional perimeter firewalls at each site from which they are being delivered services.

Of course, in any embodiment, other security such as encryption or additional firewalls can be used.

Routing within the client's pSDN VPN is performed dynamically. Routes for each SDN accessed by the client are dynamically propagated from each pSDN VRF (VRF14 554, VRF12 252, VRF07 247) throughout the clients pSDN VPN as are routes representing the client's enterprise.

Once the client's pSDN VPN has been provisioned into the remote delivery centers, the client is integrated into each SDN as described above.

Figure 6:
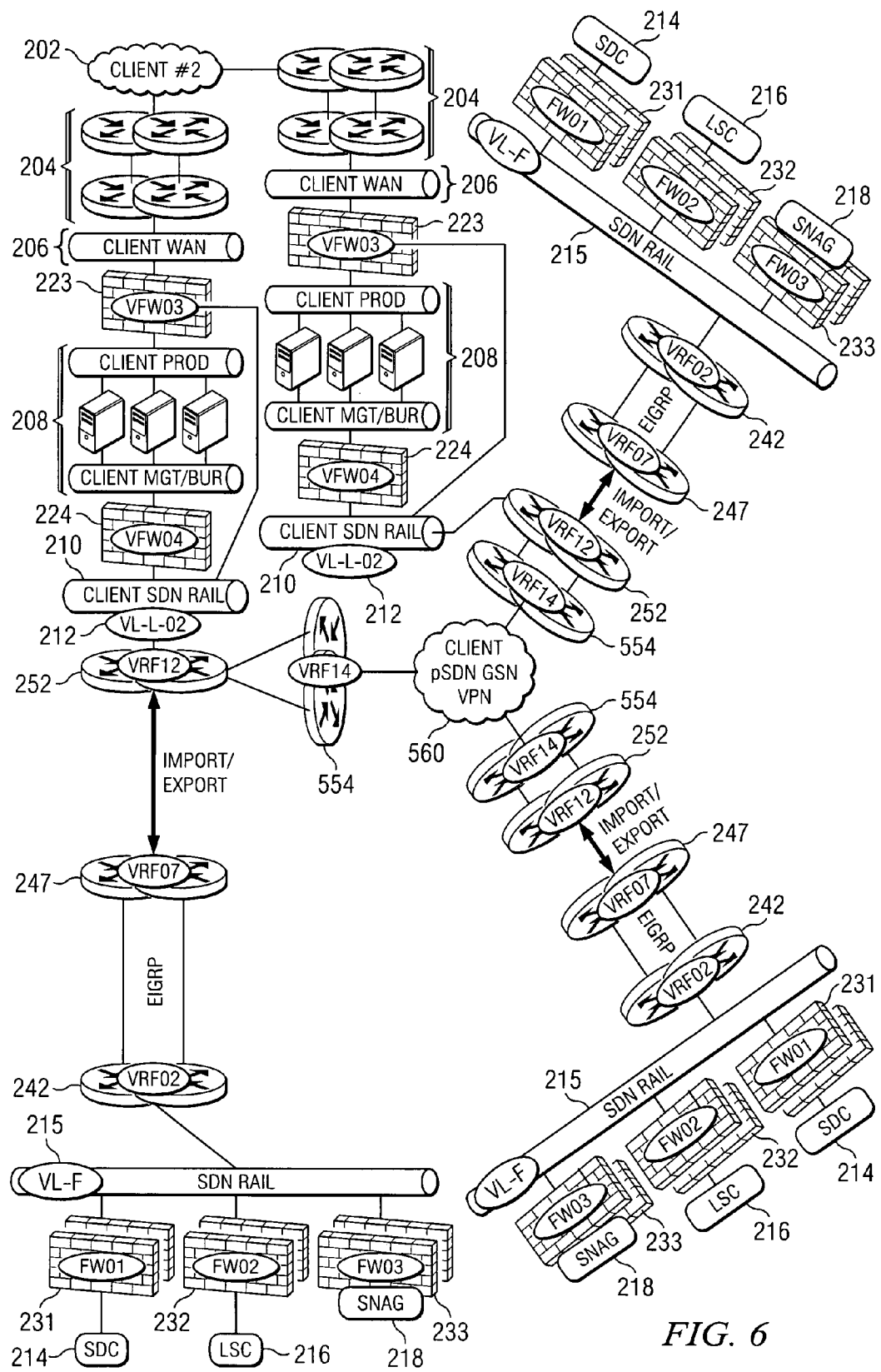
FIG. 6 depicts a block diagram of multi-homed remote client integration, in accordance with a disclosed embodiment.

FIG. 6 depicts a block diagram of multi-homed remote client integration, in accordance with a disclosed embodiment. As depicted, this embodiment includes many features as described above with relation to FIGS. 2 and 5. A multi-homed client is any client with multiple client perimeters each connected to an SDN environment in the delivery centers hosting the client perimeters. There is no fundamental difference in the manner in which each of the client's perimeters is integrated with the SDNs, however, the multiple client perimeters represent two separate points at which the client NAT addressing is advertised into the client's pSDN VPN. Additionally, the addressing for each SDN accessed by the client is known throughout the client's pSDN VPN and is advertised to the client's enterprise from each client perimeter. As shown here, client 202 is connected to the SDN environment by two different instances of elements 204, 207, 223, 208, 224, 210, and 212.

Figure 7:
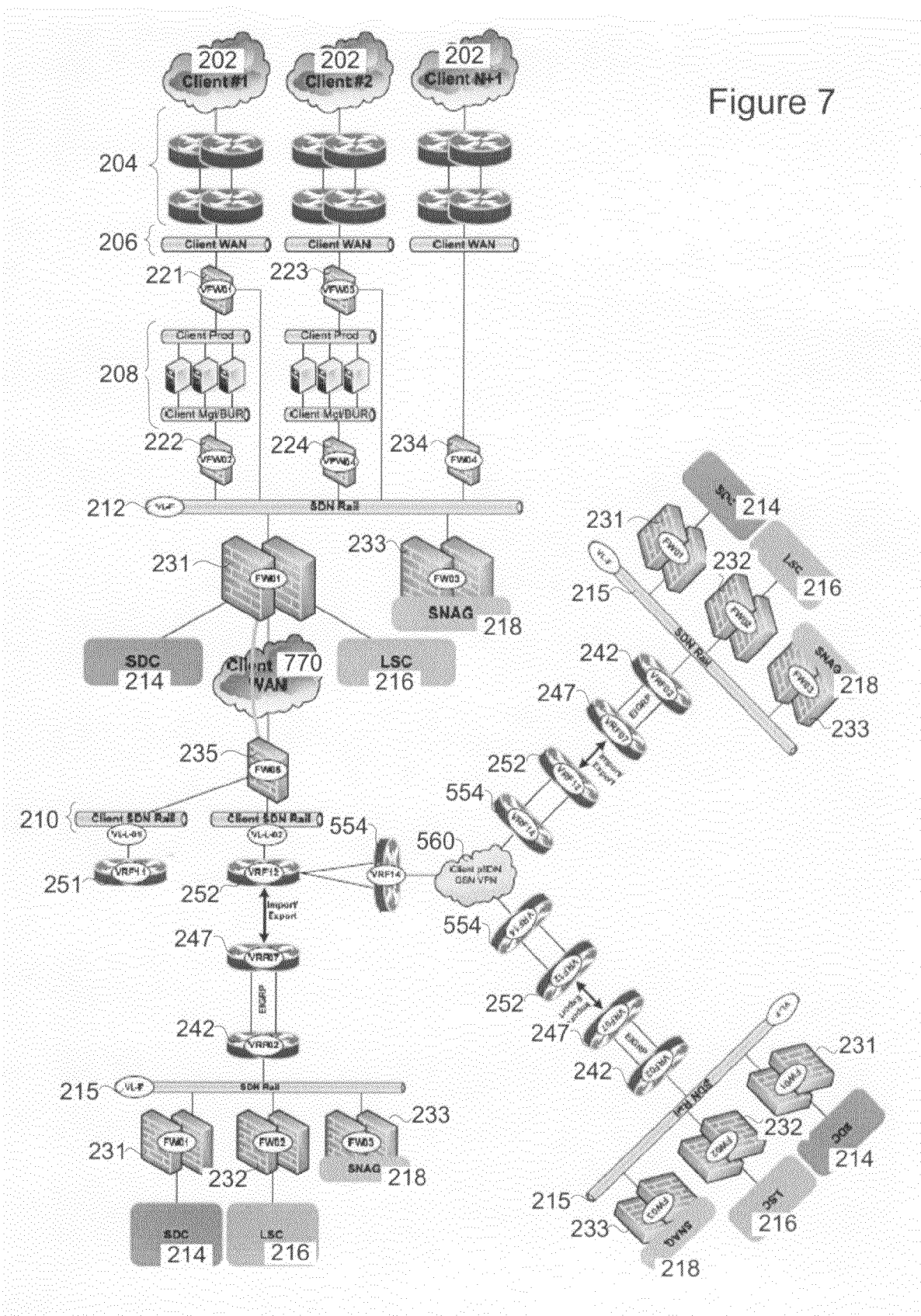
FIG. 7 depicts a block diagram of regional delivery center SDN integration, in accordance with a disclosed embodiment.
Figure 1:
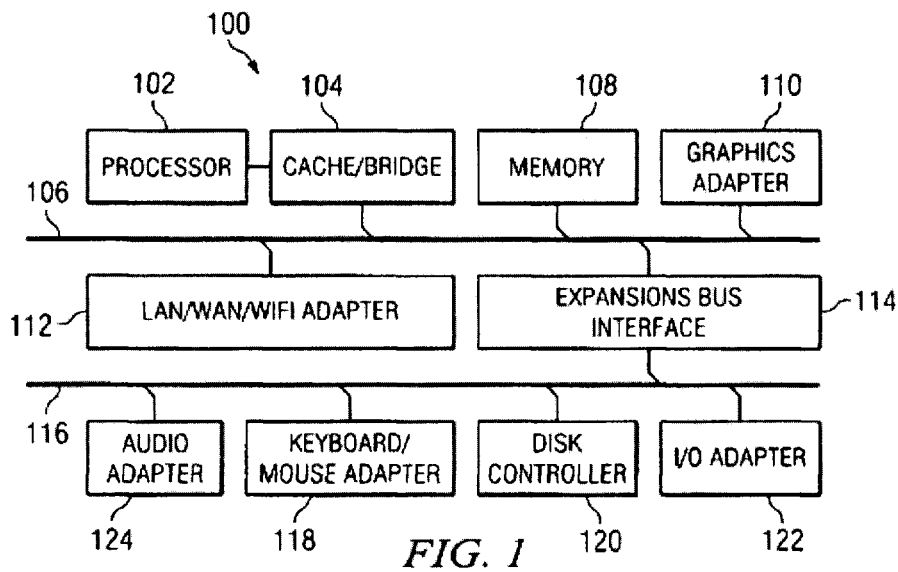
Figure 4:
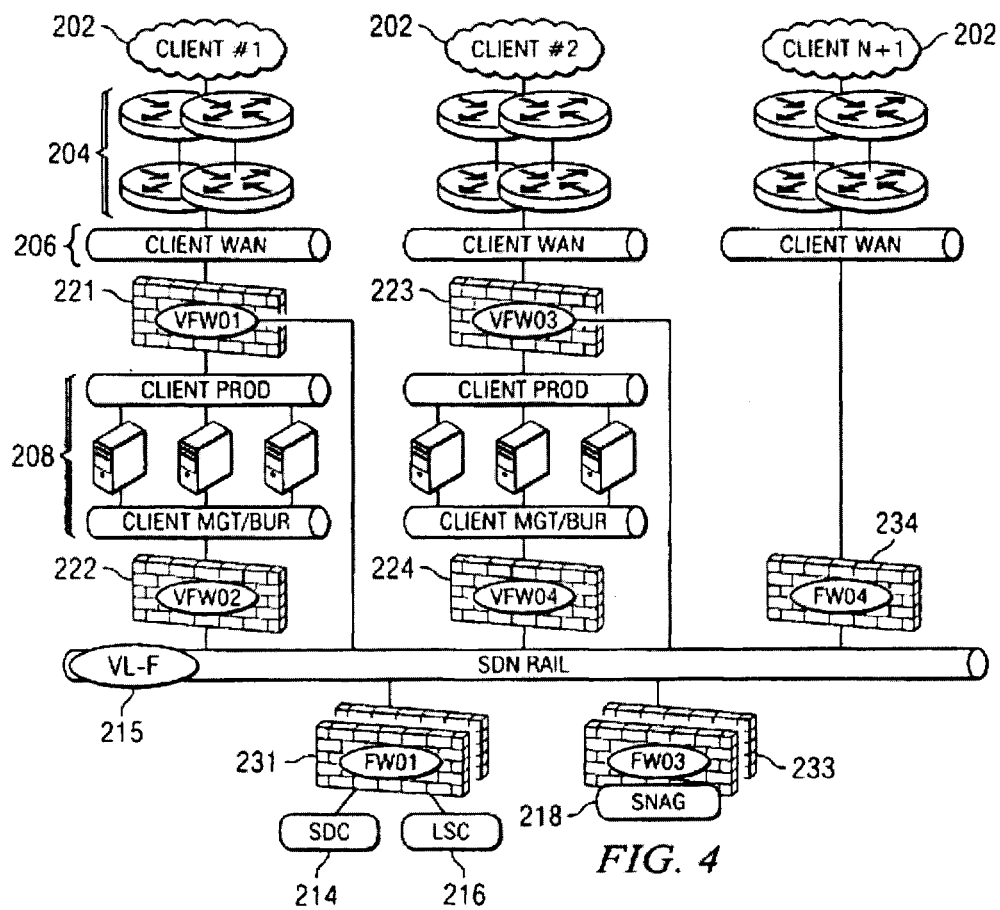
Figure 2:
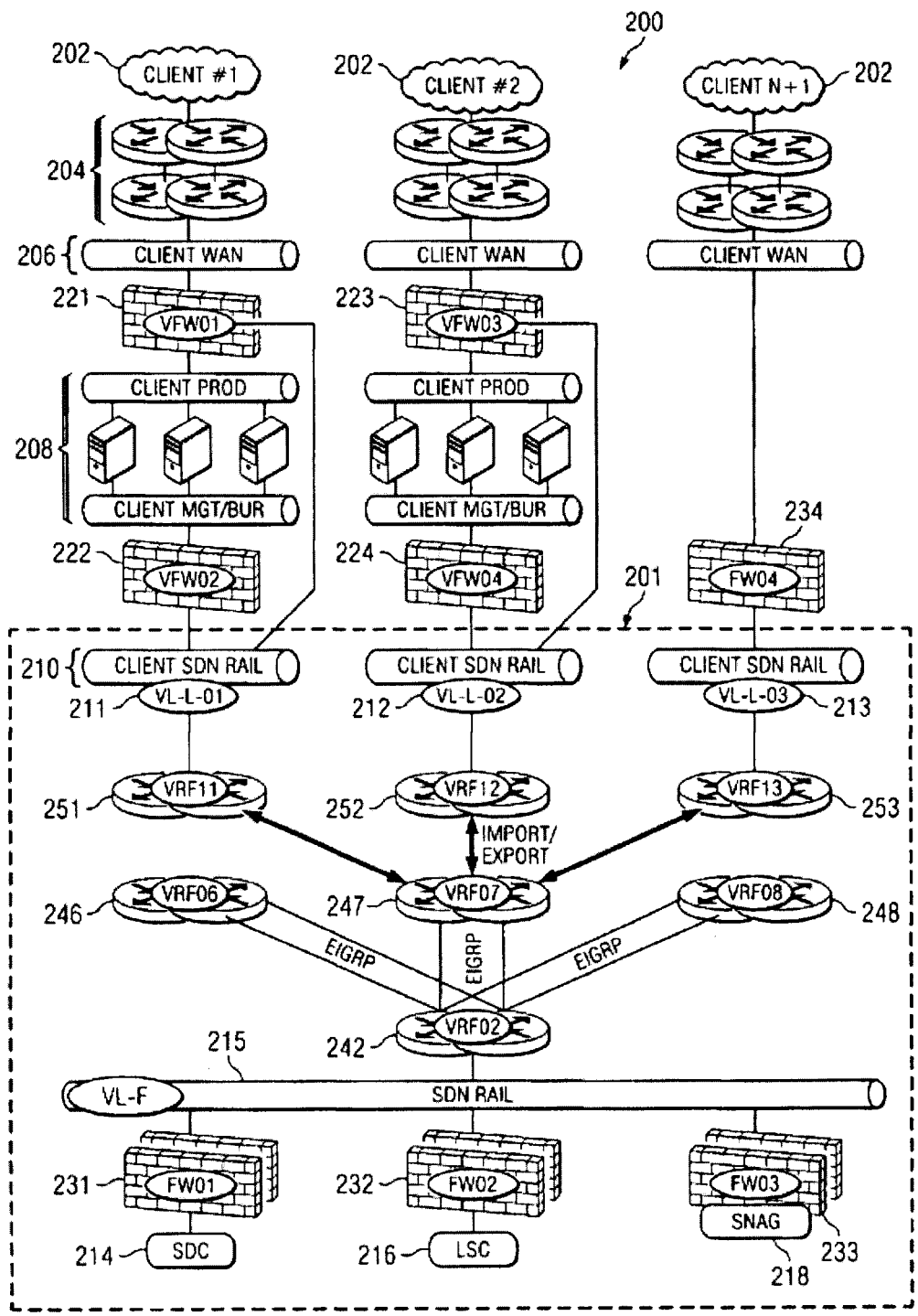
Figure 3:
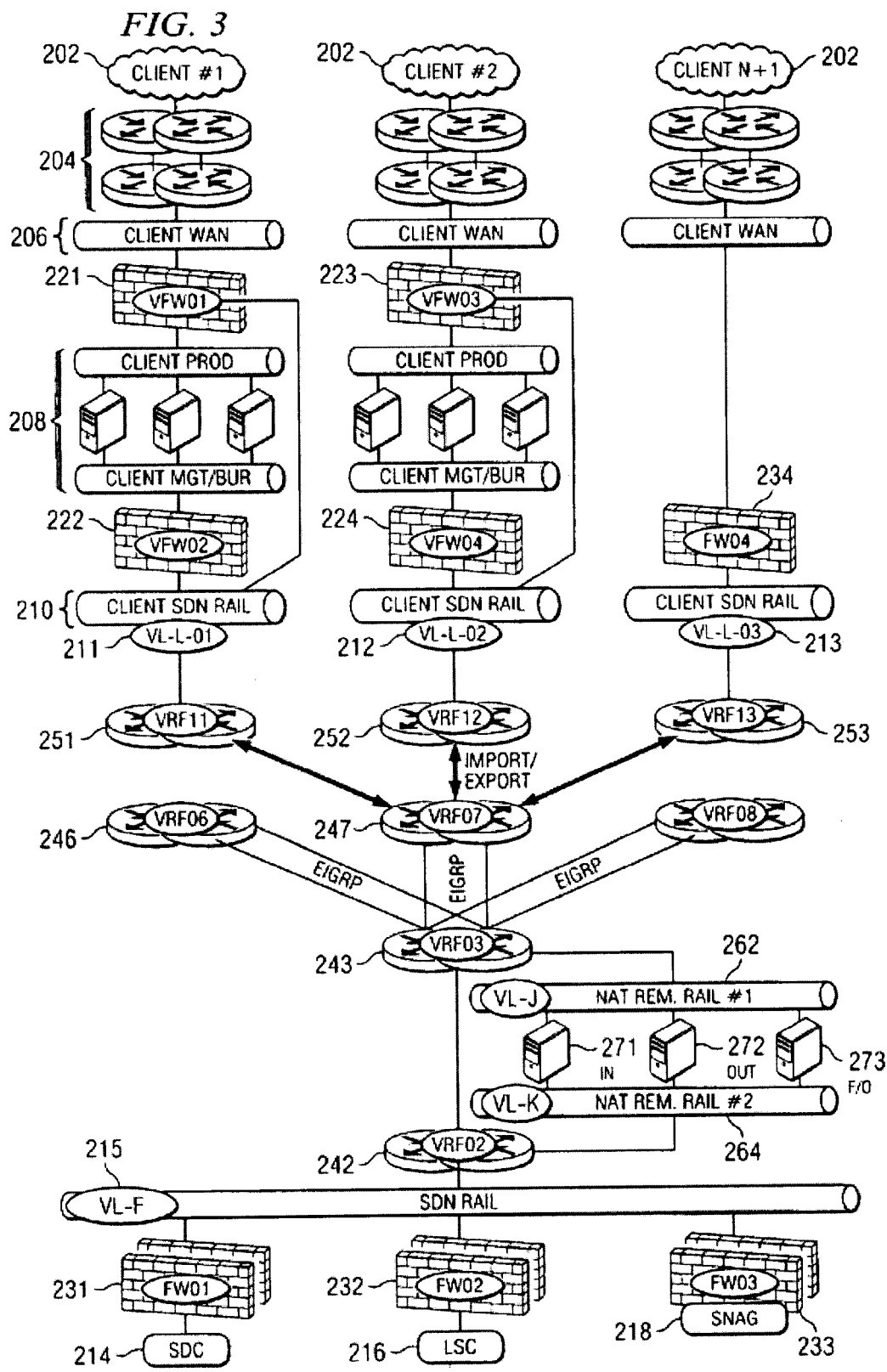
Figure 5:
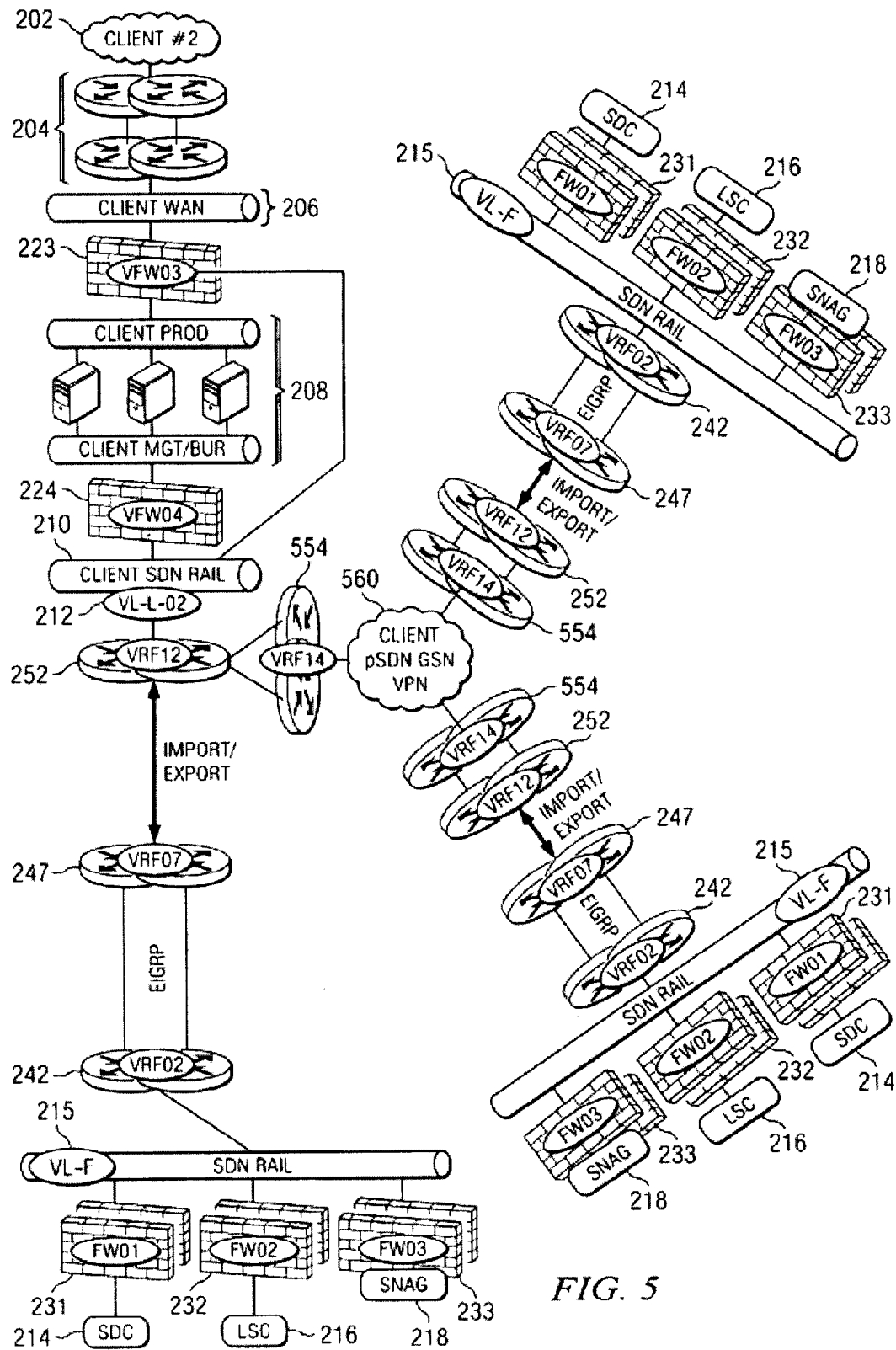
Figure 6:
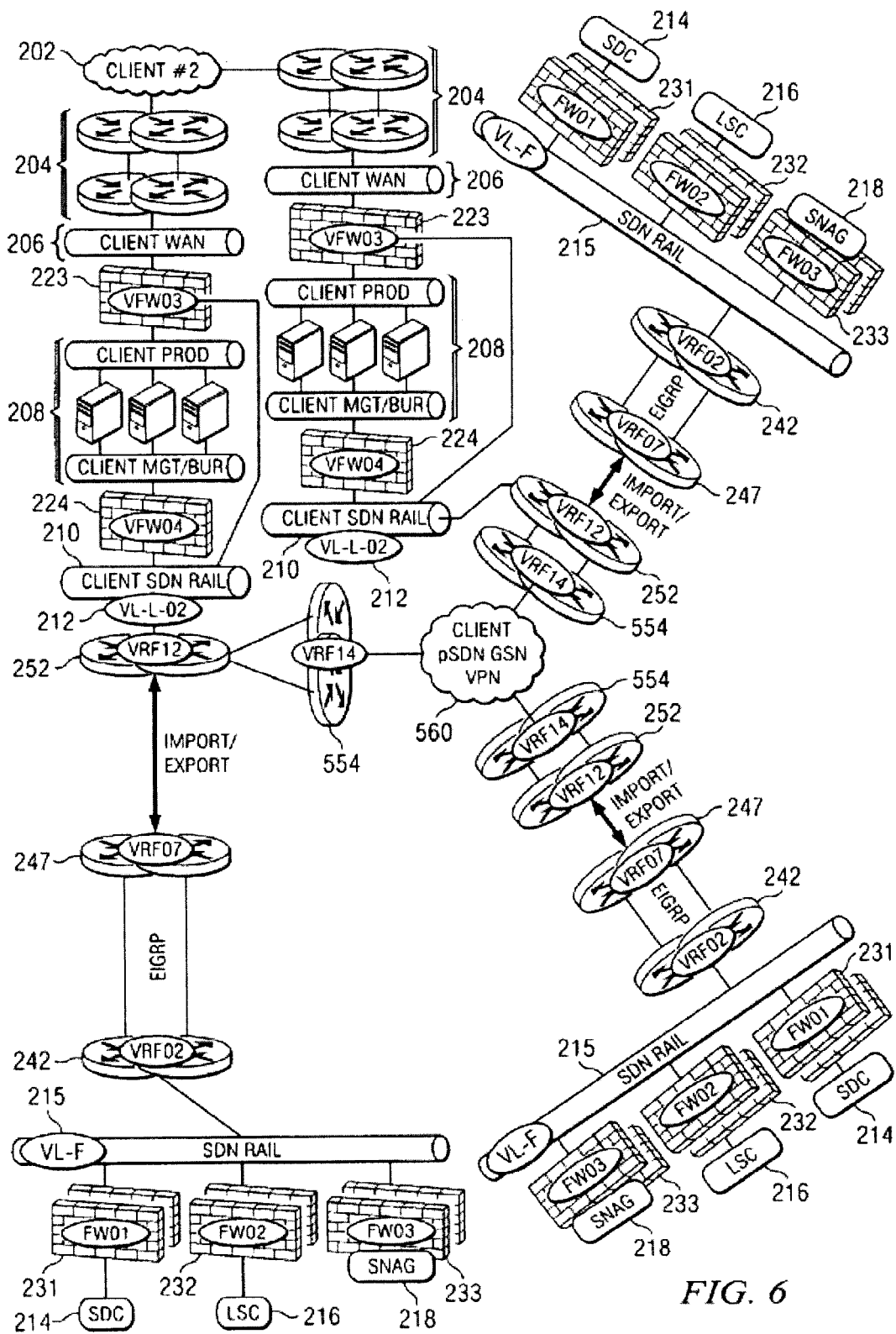
Figure 7B:
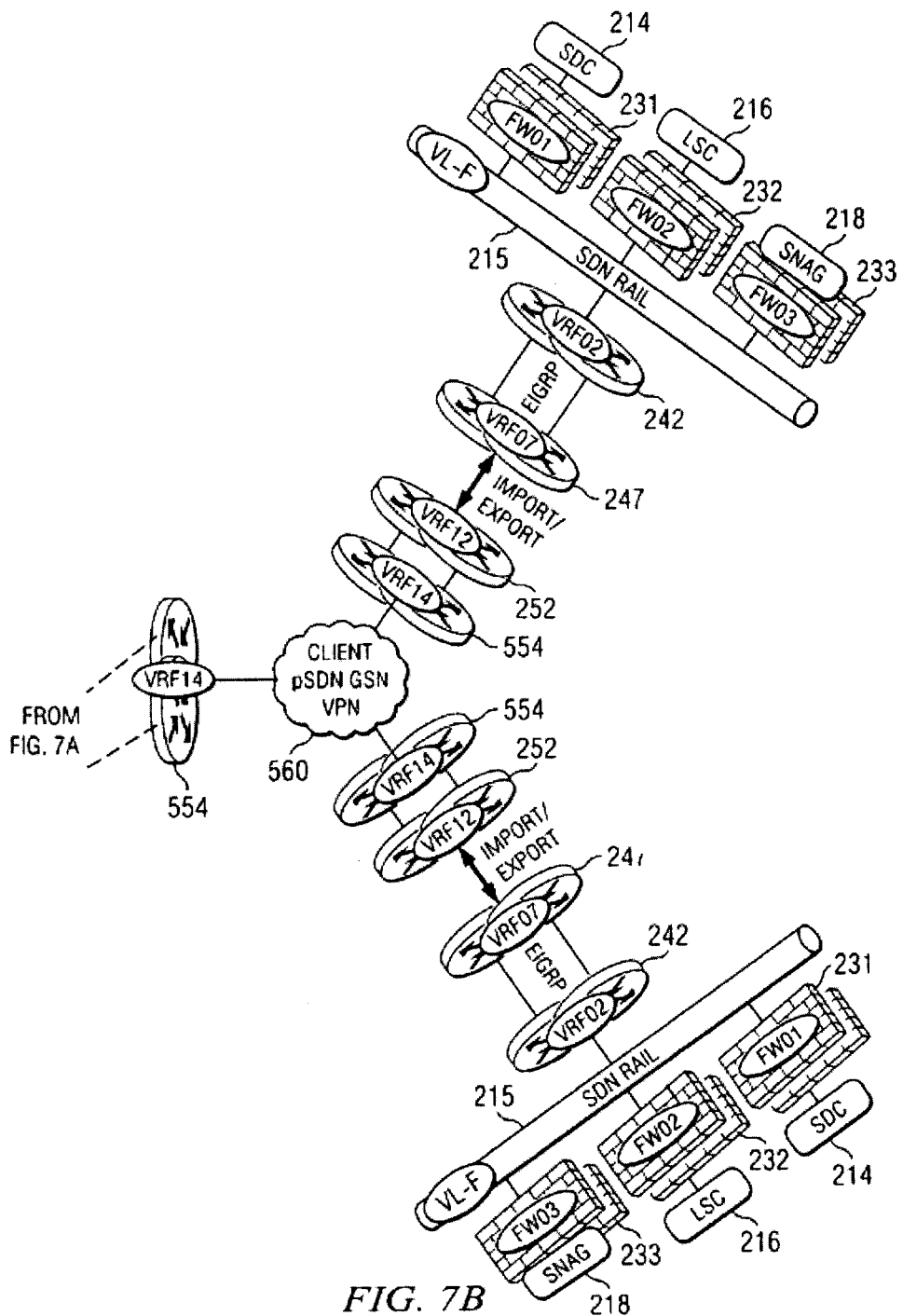

FIG. 7 depicts a block diagram of regional delivery center SDN integration, in accordance with a disclosed embodiment. As depicted, this embodiment includes many features as described above with relation to FIGS. 2 and 5. As discussed above, this architecture guide comprehends the need to install SDN environments in small, regional data centers which service one to five external clients. Many of these data centers are not serviced by multi-VPN GSN services and may likely only have connectivity to the client enterprise. However, this limitation must not preclude clients whose perimeters reside within those regional data centers from accessing leveraged tools and services. In order to facilitate client access from regional data centers to leveraged tools and applications hosted in the service provider's larger delivery centers, two 'continental' delivery centers in each geographic region impacted by a lack of multi-VPN GSN services can be used to provision a single firewall (FW05 235) each to act as concentrators for IPSEC VPNs across the client network between the larger delivery center and regional delivery centers. The IPSEC VPN between the regional delivery center and the continental delivery center will be leveraged for both SDN-to-SDN and client-to-SDN communications, including across the service provider's WAN 770. Once the client has reached a continental delivery center a client dedicated private-SDN (pSDN) VRF (VRF14 554, VRF12 252, VRF07 247) will be configured and the client's pSDN VPN 560 may then be provisioned into any delivery center allowing the client to access any tool in any delivery center.

Dedicated DMZs: On an exception basis, a subset of tools and application resources can be distributed beyond the Service Delivery Network (SDN) in dedicated DMZs residing within the client's hosting compartment but secured from the resources to which the client has direct access. The remaining resources may leveraged from the SDC or LSC. These dedicated DMZs provide increased autonomy without compromising security of compartments within the SDN. Resources physically reside within the delivery center and are dedicated to a single client to meet business and technical requirements. Resources within these DMZs will be maintained and secured by the service provider. Dedication of resources within the DMZ may be required to address unique security policies, or isolate solutions that are incapable of handling IP address scheme conflicts or are not suitable to work in conjunction with the NAT remediation tools incorporated within the SDN.

Tactical Remote Facility Connectivity: In order to securely deliver services to sites who have not yet been provisioned with multi-VPN GSN services, a tactical solution must be deployed enabling ongoing client support to be maintained and migrated onto the service provider's leveraged tools and applications hosted within the SDN. To that end, two 'continental' data centers in each region can be provisioned with IPSEC Concentrator firewalls (F9). These firewalls will support client dedicated IPSEC VPNs to tunnel client dedicated leveraged tools and applications access traffic across the client network until a client dedicated GSN VPN can be provisioned.

In various embodiments, at least one of the plurality of firewalls is a virtual firewall. In various embodiments, a leveraged services compartment is connected to provide compute resources, and the leveraged services compartment connected to communicate with the first virtual local area network. In various embodiments, the leveraged services compartment is connected to communicate with the first virtual local area network via the first firewall.

In various embodiments, a secure network access gateway is connected to communicate with the first virtual local area network. In various embodiments, a plurality of virtual local area networks are each associated with one of plurality of client networks.

In various embodiments, a plurality of virtual routing and forwarding (VRF) nodes are connected between the plurality of firewalls and the first virtual local area network. In various embodiments, a plurality of virtual local area networks are each associated with one of plurality of client networks and connected between the plurality of firewalls and the plurality of VRF nodes. In various embodiments, at least some of the plurality of VRF nodes communicate using Enhanced Interior Gateway Routing Protocol. In various embodiments, at least one NAT Remediation rail is connected to a VRF node. In various embodiments, a virtual private network is connected to a VRF node.

In various embodiments, a backup and restore rail is associated with one of the plurality of client networks. In various embodiments, a third firewall is connected between the backup and restore rail and the first virtual local area network.

In various embodiments, each of the plurality of client networks can communicate with the secure delivery compartment. In various embodiments, none of the plurality of client networks can detect another of the plurality of client networks Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

Any of the systems described and illustrated herein can be used to implement a related method for delivering services to a plurality of client networks. These methods generally include receiving requests for services from a plurality of client networks, and delivering services to the plurality of client networks using a secure service delivery network, which can be implemented using any of the network structures described herein. For example, in various embodiments of the disclosed methods, the secure service delivery network includes a service delivery compartment connected to deliver the services to the plurality of client networks, a first firewall connecting the service delivery compartment to a first virtual local area network, and a plurality of firewalls each connecting one of the plurality of client networks to the first virtual local area network. In various embodiments, no communications between the plurality of client networks can be made over the first virtual local area network.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

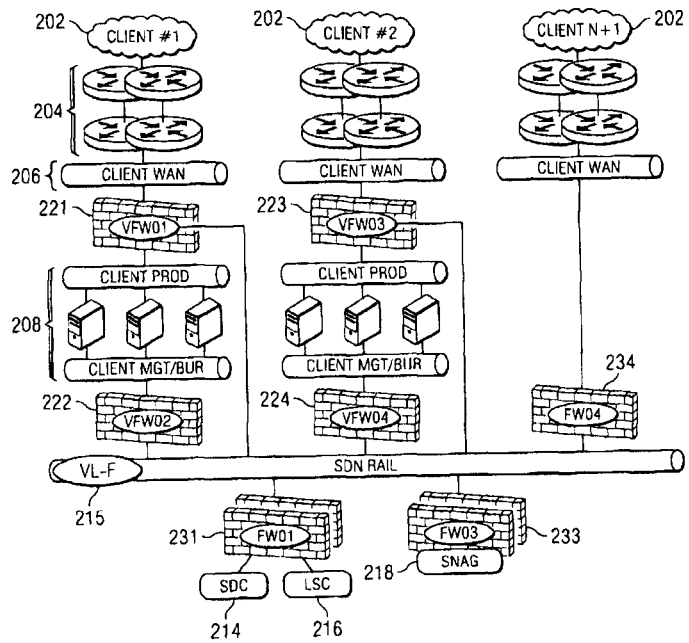

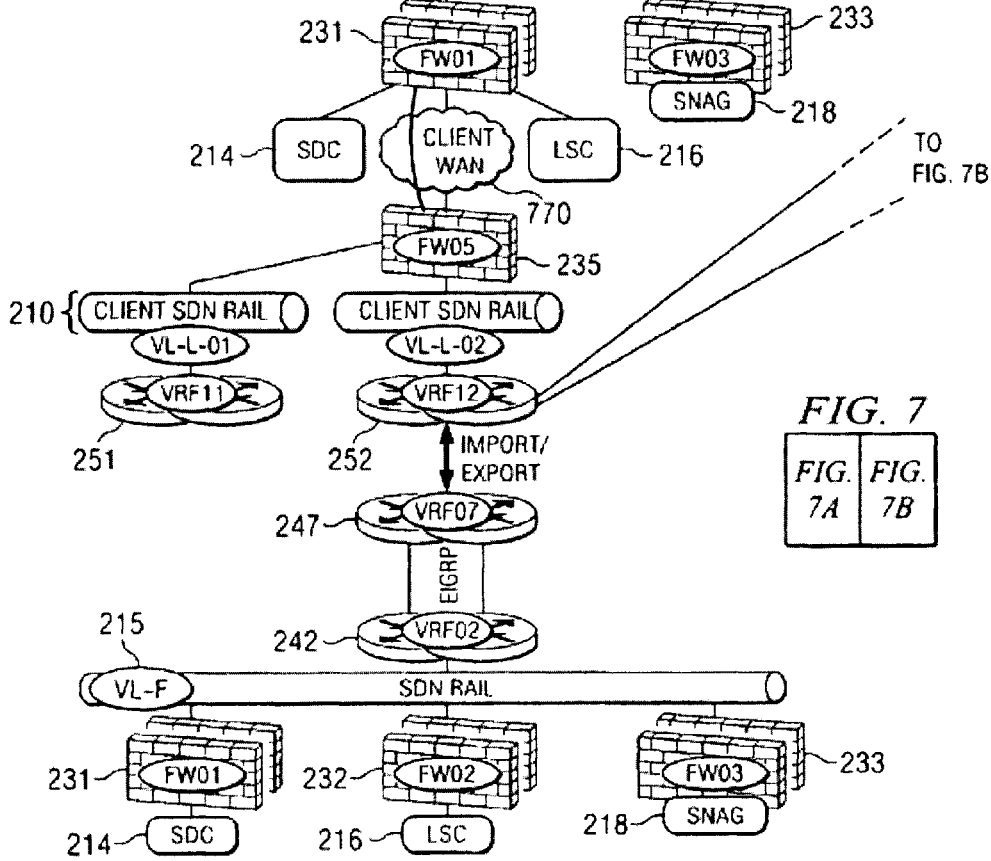

What is claimed is:

1. A secure service delivery data processing system, comprising:
   a computer for receiving requests for services from a plurality of client networks;
   a service delivery compartment application, at a computer system, connected to deliver services to a plurality of client networks using a secure service delivery network wherein said services comprise secure access to leveraged compute resources;
   a first virtual firewall, at said computer system, connecting the service delivery compartment to a first virtual local area network;
   a plurality of firewalls, at said computer system, each connecting one of the plurality of client networks to the first virtual local area network, whereby no communications between the plurality of client networks can be made over the first virtual local area network;
   a leveraged services compartment application connected to provide compute resources, the leveraged services compartment application connected to communicate with the first virtual local area network, wherein the leveraged services compartment application is connected to communicate with the first virtual local area network via the first virtual firewall;
   a plurality of virtual routing and forwarding (VRF) nodes connected between the plurality of firewalls and the first virtual local area network; and
   a plurality of virtual local area networks each associated with one of the plurality of client networks and connected between the plurality of firewalls and the plurality of VRF nodes, wherein none of the plurality of client networks can detect another of the plurality of client networks.

2. The secure service delivery data processing system of claim 1, wherein at least one of the plurality of firewalls is a virtual firewall.

3. The secure service delivery data processing system of claim 1, further comprising a secure network access gateway computer connected to communicate with the first virtual local area network.

4. The secure service delivery data processing system of claim 1, wherein at least some of the plurality of VRF nodes communicate using Enhanced Interior Gateway Routing Protocol.

5. The secure service delivery data processing system of claim 1, further comprising at least one network address translation (NAT) remediation rail connected to a VRF node.

6. The secure service delivery data processing system of claim 1, further comprising a virtual private network connected to a VRF node.

7. The secure service delivery data processing system of claim 1, further comprising a backup and restore rail associated with one of the plurality of client networks.

8. The secure service delivery data processing system of claim 7, further comprising a firewall connected between the backup and restore rail and the first virtual local area network.

9. The secure service delivery data processing system of claim 1, wherein each of the plurality of client networks can communicate with a secure delivery compartment.

10. A computer-implemented method of delivering services to a plurality of client networks, comprising:
    receiving requests for services from a plurality of client networks, by a computer system, wherein said services comprise secure access to leveraged compute resources;
    delivering the services to the plurality of client networks using a secure service delivery network, by said computer system; and
    wherein the secure service delivery network includes a service delivery compartment application connected to deliver the services to the plurality of client networks, a first virtual firewall connecting the service delivery compartment to a first virtual local area network, and a plurality of firewalls each connecting one of the plurality of client networks to the first virtual local area network,
    wherein no communications between the plurality of client networks can be made over the first virtual local area network,
    wherein a leveraged services compartment application is connected to provide compute resources, the leveraged services compartment application is connected to communicate with the first virtual local area network and the leveraged services compartment application is connected to communicate with the first virtual local area network via the first virtual firewall,
    wherein a plurality of virtual routing and forwarding (VRF) nodes are connected between the plurality of firewalls and the first virtual local area network, wherein a plurality of virtual local area networks each associated with one of a plurality of client networks and connected between the plurality of firewalls and the plurality of VRF nodes, and wherein none of the plurality of client networks can detect another of the plurality of client networks.

11. The computer-implemented method of claim 10, wherein at least one of the plurality of firewalls is a virtual firewall.

12. The computer-implemented method of claim 10, wherein the secure service delivery network also includes a secure network access gateway computer connected to communicate with the first virtual local area network.

* * * * *

UNITED STATES PATENT AND TRADEMARK OFFICE
CERTIFICATE OF CORRECTION

PATENT NO. : 8,528,070 B2
APPLICATION NO. : 11/899288
DATED : September 3, 2013
INVENTOR(S) : Bryan E. Stiekes et al.

It is certified that error appears in the above-identified patent and that said Letters Patent is hereby corrected as shown below:

Delete title page, substitute therefore the attached title page, showing the correct number of Drawing Sheets shown on attached pages.

Delete Drawing Sheets 1-6, and substitute therefore Figs., consisting of Drawing Sheets 1-7 as shown on attached pages.

Signed and Sealed this
Thirty-first Day of December, 2013

Margaret A. Focarino
*Commissioner for Patents of the United States Patent and Trademark Office*

(12) United States Patent
Stiekes et al.

(10) Patent No.: US 8,528,070 B2
(45) Date of Patent: Sep. 3, 2013

(54) SYSTEM AND METHOD FOR SECURE SERVICE DELIVERY

(75) Inventors: Bryan E. Stiekes, Warren, MI (US); Shawn A. Williams, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1286 days.

(21) Appl. No.: 11/899,288

(22) Filed: Sep. 5, 2007

(65) Prior Publication Data

US 2009/0064305 A1    Mar. 5, 2009

(51) Int. Cl.
*H04L 29/06*    (2006.01)

(52) U.S. Cl.
USPC ........... 726/11; 726/2; 726/3; 726/14; 726/15

(58) Field of Classification Search
USPC ....................................... 726/2, 3, 11, 14, 15
See application file for complete search history.

(56) References Cited

U.S. PATENT DOCUMENTS

| | | | | |
|---|---|---|---|---|
| 7,616,643 | B2* | 11/2009 | Delaney et al. | 370/395.5 |
| 7,694,343 | B2* | 4/2010 | Sobel et al. | 726/27 |
| 2002/0032766 | A1* | 3/2002 | Xu | 709/223 |
| 2002/0032797 | A1* | 3/2002 | Xu | 709/238 |
| 2002/0038339 | A1* | 3/2002 | Xu | 709/203 |
| 2002/0040434 | A1* | 4/2002 | Elliston et al. | 713/186 |
| 2004/0098624 | A1* | 5/2004 | Wesinger et al. | 713/201 |
| 2004/0103321 | A1* | 5/2004 | Wesinger et al. | 713/201 |
| 2006/0041937 | A1* | 2/2006 | Chandley et al. | 726/12 |
| 2006/0075140 | A1* | 4/2006 | Sobel et al. | 709/245 |
| 2006/0092950 | A1* | 5/2006 | Arregoces et al. | 370/396 |
| 2006/0095960 | A1* | 5/2006 | Arregoces et al. | 726/11 |
| 2007/0248103 | A1* | 10/2007 | Delaney et al. | 370/395.52 |
| 2008/0225875 | A1* | 9/2008 | Wray et al. | 370/419 |
| 2009/0129385 | A1* | 5/2009 | Wray et al. | 370/392 |
| 2009/0199177 | A1* | 8/2009 | Edwards et al. | 718/1 |
| 2009/0241108 | A1* | 9/2009 | Edwards et al. | 718/1 |
| 2009/0300605 | A1* | 12/2009 | Edwards et al. | 718/1 |

FOREIGN PATENT DOCUMENTS

WO      WO 02/03220      *    1/2002

* cited by examiner

*Primary Examiner* — Bradley Holder

(57) ABSTRACT

A secure service delivery network, including a service delivery compartment connected to deliver services to a plurality of client networks. The secure service delivery network includes a first firewall connecting the service delivery compartment to a first virtual local area network. The secure service delivery network includes a plurality of firewalls each connecting one of the plurality of client networks to the first virtual local area network, whereby no communications between the plurality of client networks can be made over the first virtual local area network. A related method is also described.

12 Claims, 7 Drawing Sheets